United States Patent [19]

Waldherr

[11] Patent Number: 4,964,225
[45] Date of Patent: Oct. 23, 1990

[54] DUAL METAL CLIP

[76] Inventor: Arthur Waldherr, 201 Freeport Dr., Bloomingdale, Ill. 60108

[21] Appl. No.: 351,090

[22] Filed: May 12, 1989

[51] Int. Cl.$^5$ .............................................. G01B 3/10
[52] U.S. Cl. ........................................ 33/768; 33/668
[58] Field of Search ................ 33/768, 759, 760, 770, 33/27.03, 668; 24/11 HC, 11 F, 11 R

[56] References Cited

U.S. PATENT DOCUMENTS

| 2,859,525 | 11/1958 | Carlson | 33/27.03 |
| 3,148,455 | 9/1964 | Aciego | 33/668 |
| 4,760,648 | 8/1988 | Doak | 33/668 |

FOREIGN PATENT DOCUMENTS 173706  1/1922  United Kingdom ............. 33/27.031

Primary Examiner—Harry N. Haroian
Attorney, Agent, or Firm—Emrich & Dithmar

[57] ABSTRACT

A clip for use with a retractable measuring tape container where the clip has a flat portion connected at one end to a first pencil holder and connected at the other end to a second pencil holder. The first pencil holder is shaped to receive and hold a pencil. The second pencil holder is shaped to receive and hold a carpenter's pencil hexagonal in transverse cross section. The clip has sinuous means intermediate said first and second pencil holders for cooperating with a releasable fastener mechanism on the container for maintaining the clip firmly against the side of the container for a retractable measuring tape.

14 Claims, 1 Drawing Sheet

DUAL METAL CLIP

BACKGROUND OF THE INVENTION

This invention relates to a scribing device to enable carpenters, workmen, and handymen easily to scribe a circle using a common retractable measuring tape and is an improvement over the clip shown in my prior application Ser. No. 32,548, filed Apr. 1, 1987, now abandoned the disclosure of which is incorporated by reference. This is often desirable in construction and the like to scribe portions of circles or even entire circles, but it is often difficult to do and cumbersome when the radius of the circle is rather large. The present invention enables circles of any radius commonly necessary to be scribed at the construction site without resorting to any tools in addition to that which the ordinary carpenter or workmen has in his possession.

It is an object of the present invention to provide a clip for use with a retractable measuring tape container comprising a flat portion connected at one end to a first pencil holder and connected at the other end to a second pencil holder, the first pencil holder shaped to receive and hold a pencil, the first pencil holder having adjacent surfaces forming 60° angles therebetween, the second pencil holder shaped to receive and hold a carpenter's pencil hexagonal in transverse cross-section, the second pencil holder having adjacent surfaces forming 60° internal angles therebetween, and sinuous means intermediate the first and second pencil holders for cooperating with a releasable fastener mechanism on the container for maintaining the clip firmly against the side of the container for a retractable measuring tape.

It is another object of the present invention to provide a clip for use with a retractable metal tape in a container, comprising a flat portion connected at one end to a first pencil holder and connected at the other end to a second pencil holder, the first pencil holder having a plurality of surfaces including spaced apart legs interconnected by a bight portion wherein the bight portion and the legs form internal angles of about 60° between adjacent holder surfaces, the second pencil holder having a plurality of surfaces including spaced apart elongated legs interconnected by a bight wherein the bight portion forms a 60° internal angle, and means intermediate the first and second pencil holders for cooperating with latching mechanism for maintaining the clip firmly against the side of a container for a retractable measuring tape.

A final object of the present invention is to provide a container having opposed substantially flat sides and a retractable measuring tape therein, a clip removably mounted on one of the sides of the container, the clip having a central portion connected to first and second pencil holders, one of the pencil holders shaped to receive a pencil having a regularly hexagonal cross-section and the other pencil holder shaped to receive a carpenter's pencil having opposed sides elongated.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
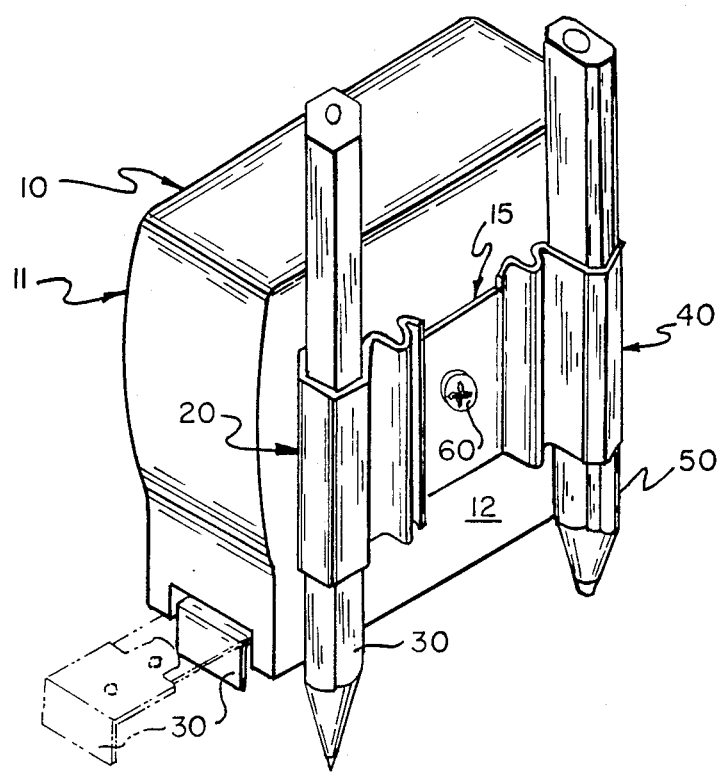
FIG. 1 is a perspective view of a retractable metal tape showing the present invention.
Figure 2:
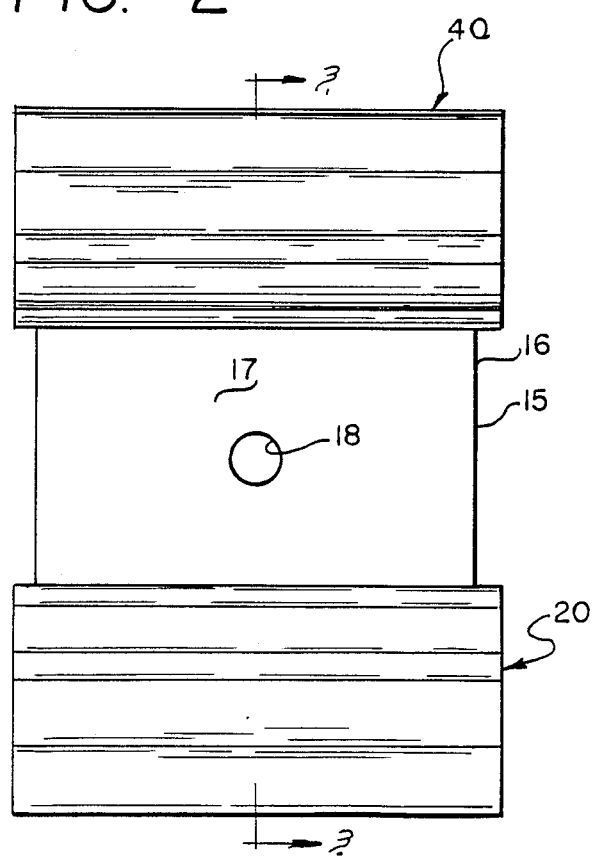
FIG. 2 is a top plan view of the inventive clip.
Figure 3:
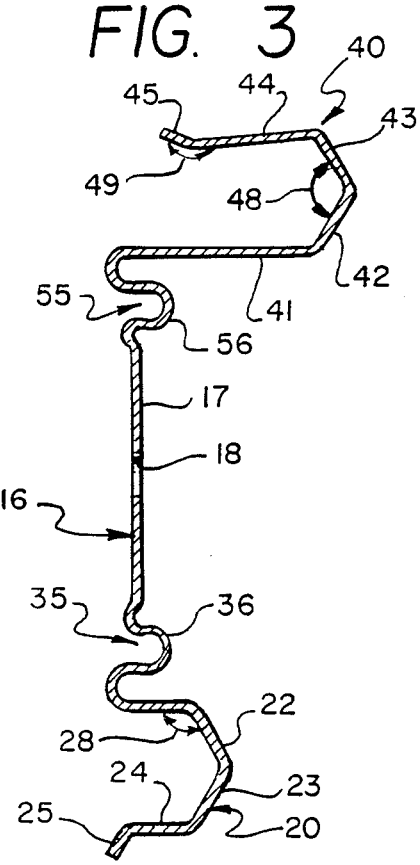
FIG. 3 is a sectional view of the clip illustrated in FIG. 2 as seen along line 3—3 thereof.

Referring to the drawings, there is illustrated a tape measure 10 having a plastic or metal case 11 with opposed flat sides 12 housing a measuring tape 13 is accessible to the user. The inventive clip 15 is preferably stamped or molded of a single piece 16 which may be metal or plastic having a central portion 17 through which is a central aperture 18, for a purpose hereinafter explained.

The clip 15 includes a first pencil holder 20 shaped and constructed to receive and maintain therewithin a first pencil 30 and a second pencil holder 40 shaped and constructed to receive and maintain there within a carpenter's pencil 50. The first pencil holder 20 is generally hexagonal in shape to be complimentary to the hexagonal transverse cross-section of the pencil 30. It is understood that the first pencil holder 20 is not a true hexagon since it is not a closed figure but it does include opposed legs 21 and 24 interconnected by a bight portion composed of sections 22 and 23 and a stub leg 25 integrally connected to the leg 24. The sections 21–25, inclusive, of the first pencil holder define three internal angles 28 each of which measures about 60° of arc. It should be noted that the stub leg 25 is shorter than the other sections or legs 21–24 to facilitate insertion and removal of the associated pencil 30 and extends outwardly away from the leg 24 and defines with the leg 24 an angle of greater than 90°.

Intermediate the pencil holder 20 and the aperture 18 is a sinuous portion 35 having an arcuate bearing surface 36, for a purpose hereinafter set forth. The second pencil holder 40 is generally shaped complimentary to a carpenter's pencil 50 which is hexagonal in transverse cross-section but not a regular hexagon as is the pencil 30. Rather, the carpenter's pencil 50 has elongated sides and accordingly the opposed legs 41 and 44 are elongated to accommodate for the different shape of the pencil 50 with respect to the pencil 30. A bight formed of sections 42 and 43 defines an internal angle 48 which measures 60° in arc. The stub leg or surface 45 which is integral with the leg 44 extends outwardly away from the leg 41 and defines with the leg 44 an internal angle 49 having a measurement exceeding 90°. A sinuous portion 55 is intermediate the aperture 18 and the second pencil holder 40 and inclues an arcuate bearing surface 56. Finally, a fastener such as a phillips head metal screw 60 may removably hold the clip 15 on the flat side 12 of the tape measure case 11 as illustrated.

The purpose of the present invention is to provide a easy means for holding a scribing tool such as a pencil 30 or a carpenter's pencil 50 in place when a carpenter or workman desires to scribe a circle or a portion of a circle. To facilitate this, the tape 13 is extended to a predetermined and desired extent and thereafter a nail (not shown) or other means is used to fasten the end of the tape which usually has a grommet in it to the to the center of the circle or arc to be scribed. Thereafter the appropriate instrument is inserted into the clip 15, the pencil 30 or the carpenter's pencil 50 whichever is preferred and the desired arc is scribed.

In the usual case, the tape measure 10 will have attached to it a belt clip (not shown) which is generally one of two widths either ¾ inch or 1 ⅛ inch width. Accordingly, the distance between the facing surfaces of leg 21 of the first pencil holder 20 and leg 41 of the second pencil holder 40 is 1 ⅛ inches. The distance between the arcuate bearing surfaces 36 and 56 is ¾ inches. Accordingly, if a tape measure 10 has the usual belt clip on it which is 1 ⅛ inch wide, then the clip 15 of the present invention can be slipped underneath the belt clip and the bearing surfaces 41 and 21 will engage the belt clip and maintain the clip 15 in fixed relationship during the scribing operation. If on the other hand, the belt clip is only ¾ inch wide, then the clip 15 will slip underneath the belt clip and bearing surfaces 36 and 56 will engage the outer edges of the belt clip and maintain the clip 15 in place during the scribing operation. If the tape measure 10 as illustrated has no belt clip then a screw or fastener 60 must be used to hold the clip 15 in place. It will be understood to those skilled in the art that the hole tapped in the side 12 of the case 11 can receive either the clip 15 or the ordinarily commonly used belt clip, (not shown). To facilitate sliding the clip 15 under a belt clip, the central portion 17 of the clip 15 is relatively thin.

As seen from the drawings, the legs 41 and 44 of the second pencil holder 40 are somewhat elongated to accommodate for the elongated sides of the carpenter's pencil 50. It will be seen upon close inspection that the leg 44 is not parallel to leg 41 but rather inclines toward it so that the internal angles formed by the leg 44 and the section 43 and the internal angle formed by the leg 41 and the section 42 are less than 60°. The outwardly angled position of the stub leg 45 facilitates sliding a carpenter's pencil 50 into the holder 40 of the clip 15 which may be done prior to the time that the clip 15 is either slipped under a belt clip or is attached to the tape measure 10 as illustrated in FIG. 1 of the drawings. Similarly, the first pencil holder 20 will have some resiliency to it whether the pencil holder is made out of plastic or metal and the stub leg 25 also facilitates the insertion or removal of a regular pencil 30 as illustrated. Finally, it should be noted that leg 24 inclines toward leg 21 so the internal angle formed by legs 23 and 24 is slightly less than 60° and provides gripping for a pencil 30, whether the pencil is hexagonal or circular in cross-section.

While there has been disclosed what is considered to be the preferred embodiment of the present invention, it is understood that various changes in the details may be made without departing from the spirit, or sacrificing any of the advantages of the present invention.

I claim:

1. A one-piece clip for use with a retractable measuring tape container, comprising a flat portion connected at one end to a first pencil holder and connected at the other end to a second pencil holder, said first pencil holder shaped to receive and hold a pencil, said first pencil holder having adjacent surfaces forming 60° angles therebetween, said second pencil holder shaped to receive and hold a carpenter's pencil hexagonal in transverse cross section, said second pencil holder having adjacent surfaces forming 60° internal angles therebetween, and sinuous means intermediate said first and second pencil holders connected thereto and to said flat portion for cooperating with a releasable fastener mechanism on the container for maintaining said clip firmly against the side of the container for a retractable measuring tape.

2. The clip of claim 1, wherein the clip is plastic.

3. The clip of claim 1, wherein the flat portion has a hole therein to receive a fastener mounting said clip to the tape container.

4. The clip of claim 1, wherein said first pencil holder has five surfaces defining three internal angles of about 60°, one of said surfaces having a shorter extent than the other of said surfaces.

5. The clip of claim 1, wherein said second pencil holder has five surfaces forming one 60° internal angle and two internal angles of less than 60°.

6. The clip of claim 5, wherein the surfaces of said clip forming angles less than 60° are elongated with respect to the surfaces forming the 60° internal angles.

7. The clip of claim 6, wherein a surface extends outwardly from one of the surfaces forming an internal angle of greater than 90°.

8. A one-piece clip for use with a retractable metal tape in a container, comprising a flat portion having an aperture therein connected at one end to a first pencil holder and connected at the other end to a second pencil holder, said first pencil holder having a plurality of surfaces including spaced apart legs interconnected by a bight portion wherein said bight portion and said legs form internal angles of about 60° between adjacent holder surfaces, said second pencil holder having a plurality of surfaces including spaced apart elongated legs interconnected by a bight wherein said bight portion forms a 60° internal angle, and a releasable fastener extending through said aperture in said flat portion for maintaining said clip firmly against the side of a container for a retractable measuring tape.

9. The clip of claim 8, wherein the bight for each of said first and second holders includes two angularly disposed surfaces.

10. The clip of claim 8, wherein said means includes connected arcuate portions.

11. The clip of claim 8, wherein said first pencil holder has five surfaces defining three internal angles of about 60°, one of said surface having a shorter extent than the other of said surfaces.

12. The clip of claim 8, wherein said second pencil holder has five surfaces forming one 60° internal angle and two internal angles of less than 60°.

13. The clip of claim 12, wherein the surfaces of said clip forming angles less than 60° are elongated with respect to the surfaces forming the 60° internal angles.

14. The clip of claim 13, wherein a surface extends outwardly from one of the surfaces forming an internal angle of greater than 90°.

* * * * *